United States Patent [19]

Uehara

[11] Patent Number: 4,911,630
[45] Date of Patent: * Mar. 27, 1990

[54] DEVICE FOR PREVENTING SCATTERING OF EJECTED, MOLDED ARTICLES FOR USE IN RESIN MOLDING MACHINE

[76] Inventor: Akira Uehara, 1-19-18, Nishi-Tsutsujigaoka, Chofu-Shi, Tokyo, Japan, 182

[*] Notice: The portion of the term of this patent subsequent to May 9, 2006 has been disclaimed.

[21] Appl. No.: 168,456

[22] Filed: Mar. 15, 1988

[30] Foreign Application Priority Data

Oct. 30, 1987 [JP] Japan ................................ 62-139218
Nov. 9, 1987 [JP] Japan ................................ 62-166464

[51] Int. Cl.$^4$ .............................................. B29C 45/84
[52] U.S. Cl. ..................................... 425/151; 264/334; 425/556
[58] Field of Search ............... 425/139, 151, 152, 153, 425/542, 554, 556, DIG. 200, DIG. 201, DIG. 33, DIG. 34; 264/334

[56] References Cited

FOREIGN PATENT DOCUMENTS 159225 4/1980 Japan .
0159225 11/1981 Japan .
194011 6/1982 Japan .
0194011 12/1983 Japan .

Primary Examiner—Jay H. Woo
Assistant Examiner—Timothy W. Heitbrink
Attorney, Agent, or Firm—Sandler & Greenblum

[57] ABSTRACT

Disclosed is a device for preventing the scattering of ejected molded articles in a plastic forming. The scattering prevention device includes screens made of a synthetic resin film and disposed at both sides of molds mounted on a fixed die plate and a movable die plate and inside a space defined by tie bars in such a manner that the molds can be covered, and magnetic assemblies coupled to the two lateral ends of each of the screens for fixing the screen to the molds or die plates. The synthetic resin film screens are mounted on the molds or the die plates only by the use of the magnetic assemblies. Each of the screen follows the clamping of the mold, and is contracted and folded. It is extended when it follows the opening of the movable mold.

22 Claims, 11 Drawing Sheets

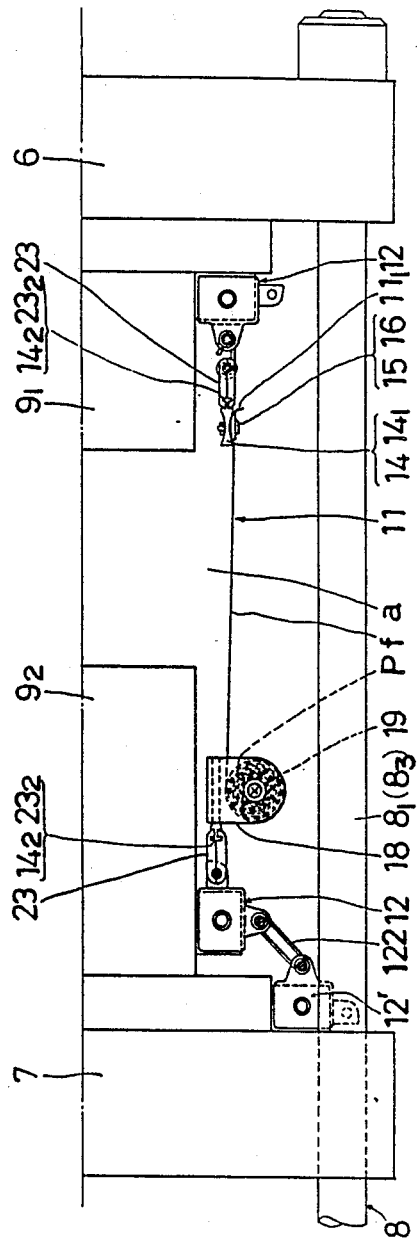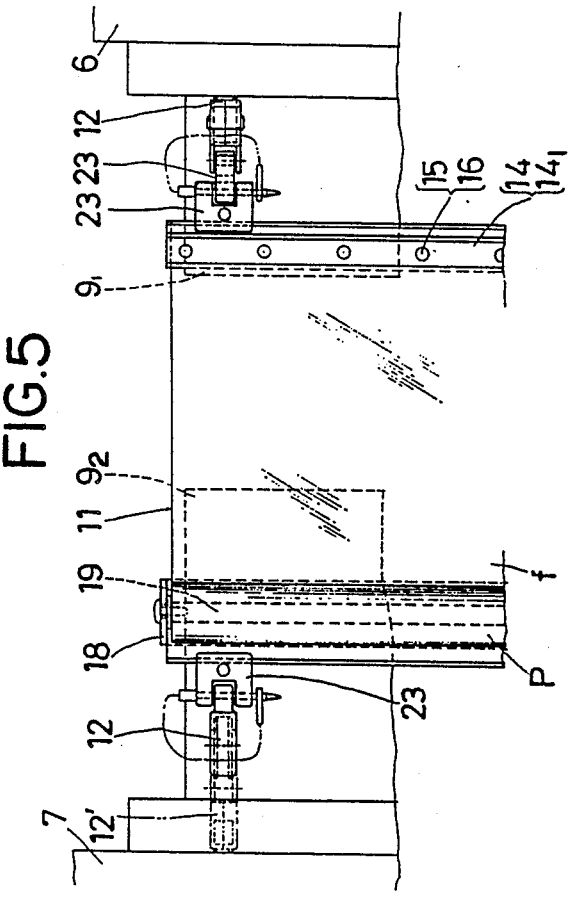

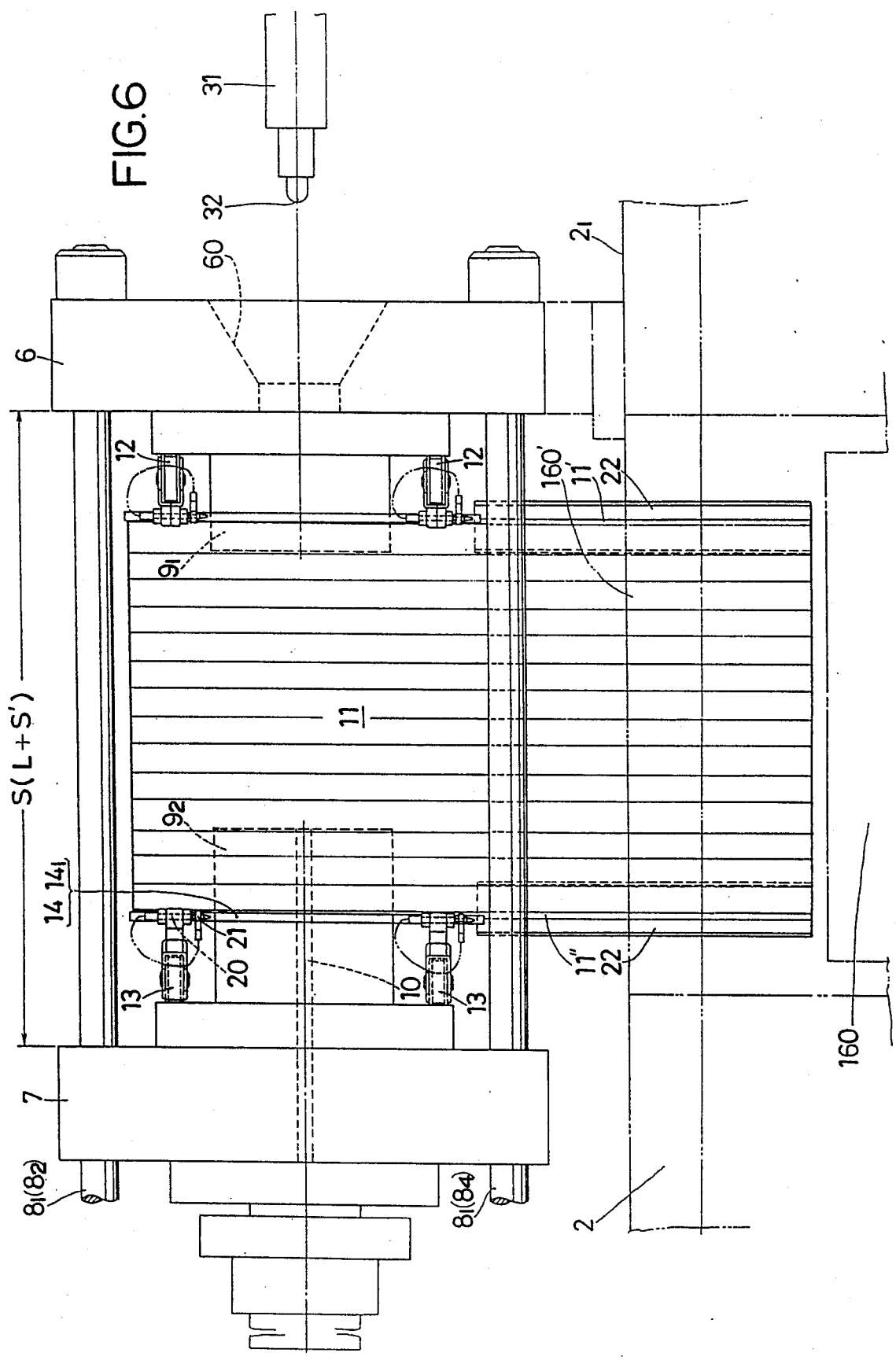

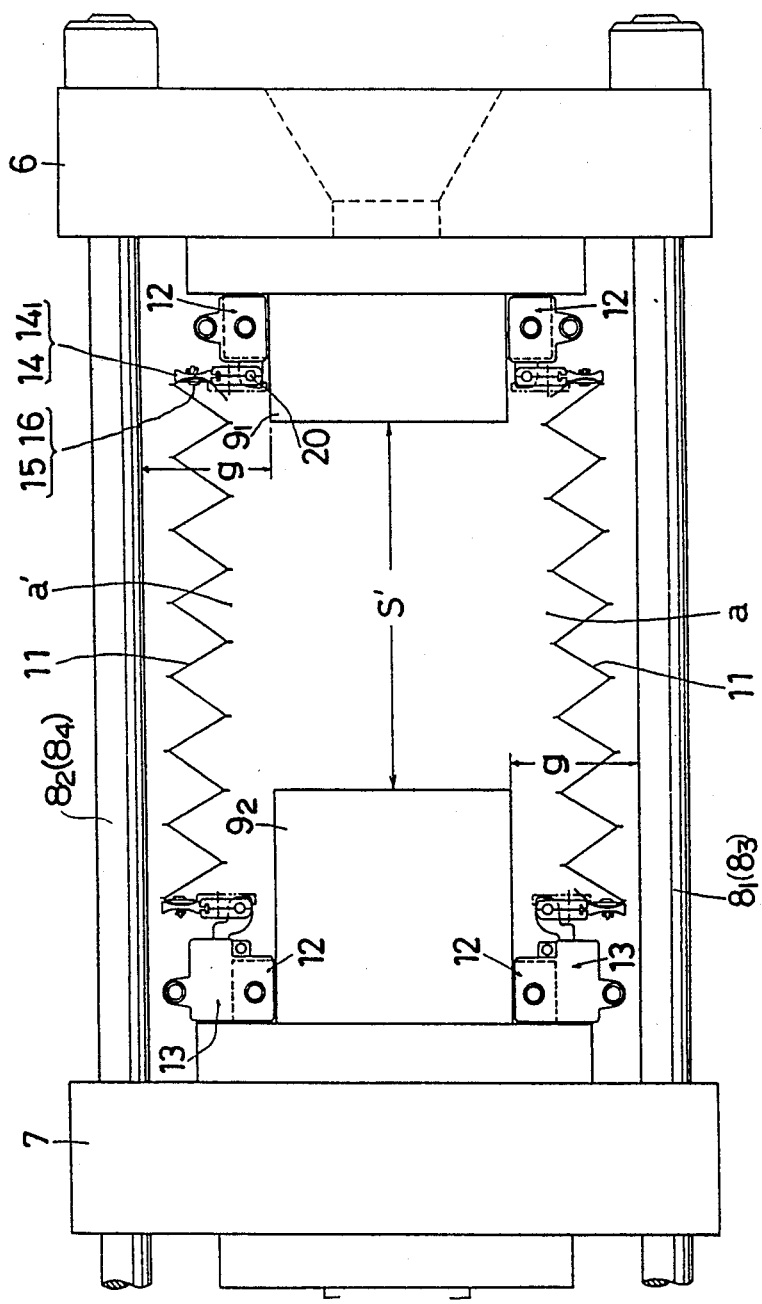

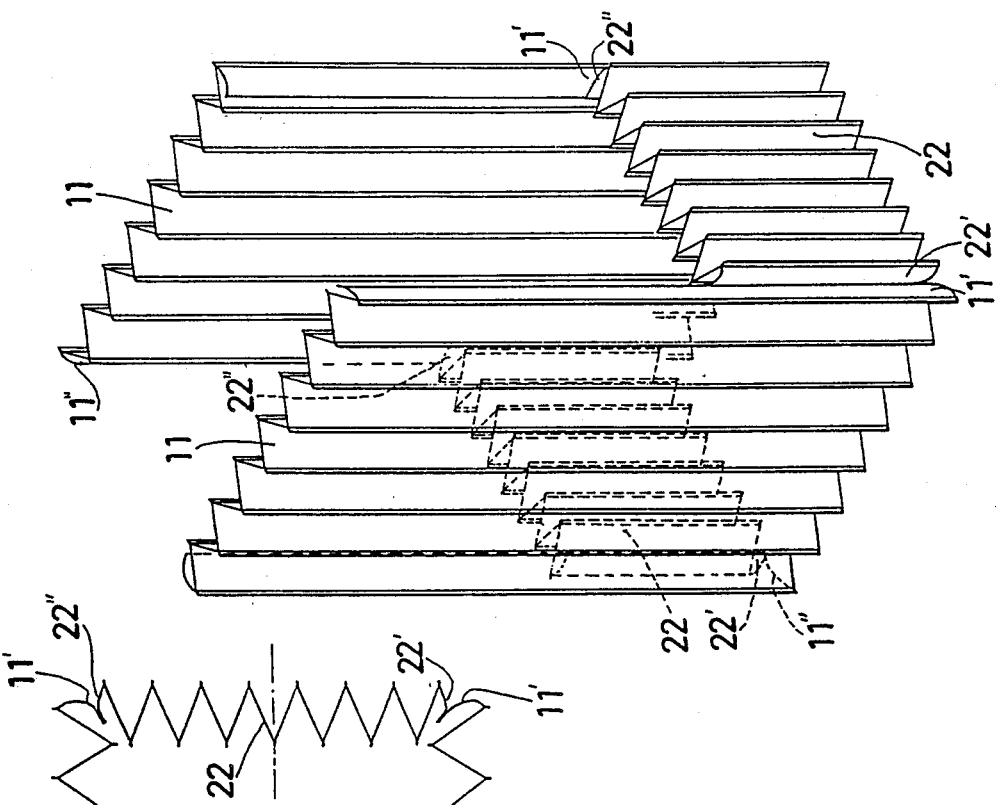
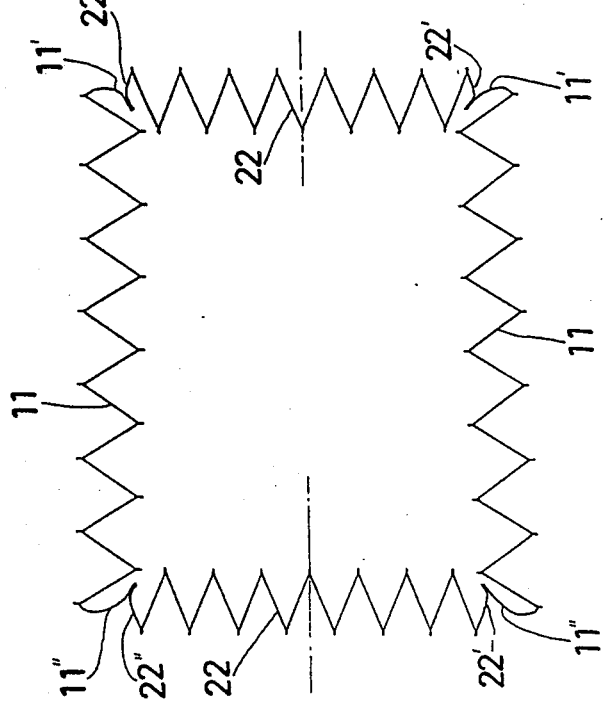
FIG.10
FIG.11

DEVICE FOR PREVENTING SCATTERING OF EJECTED, MOLDED ARTICLES FOR USE IN RESIN MOLDING MACHINE

BACKGROUND OF THE INVENTION

Field of the Invention:

The present invention relates to a device for preventing the scattering of molded articles ejected from a resin molding machine which produces a plastic, and, more particularly, to a device for preventing the scattering of molded articles for use in an injection molding machine which comprises synthetic resin film screens for curtaining a gap formed when a mold is divided so as to prevent the scattering of the molded articles when they are ejected from the mold immediately after they being processed by the injection molding machine, and magnetic assemblies for fixing the screens by utilizing the attractive force thereof.

Description of the Prior Art:

Known and commonly used injection molding machines comprise a frame 2, an injection mechanism section 3, a mold clamping mechanism section 4, a hydraulic drive section 5, an electric control section, and so on, as shown in FIGS. 14 and 15.

The injection mechanism section 3 is generally designed to inject a melting material from an injection nozzle 32 provided at the distal end of a heating cylinder 31 through a main sprue (not shown) into a runner which communicates with a plurality of cavities through gates.

The mold clamping mechanism section 4 includes a fixed die plate 6, a movable die plate 7, tie bars 8 ($8_1$ to $8_4$) inserted through the fixed and movable die plates 66 and 7 at the four corners thereof, a fixed mold $9_1$ mounted on the fixed die plate 6, and a movable mold $9_2$ counted on the movable die plate 7. After the molding by the fixed mold $9_1$ and the movable mold $9_2$ has been completed, the mold is opened, then molded articles are removed from the mold by an ejector 10 into a discharge section 160 where they are accommodated in a certain container.

In the case of resin molded articles of the type which need to be kept clean, attention must be paid to ensure that not even one soiled molded article is included so as to avoid the problems which might otherwise occur when they are assembled to form a finished product.

However, in the conventional injection molding machine, since both sides of the opened molds $9_1$ and $9_2$ fixed to the fixed and movable die plates 6 and 7 are open, when the molded articles are released from the mold by the ejector 10, the runner and the molded articles are separated from each other at the connecting gates and the separated molded articles are often struck against the lower tie bars and are soiled by a lubricant for the movable die plate or fall on the base surface of the frame and are dirtied by the oil coated thereon. Alternatively, the molded articles do not drop into the container but are scattered therearound.

If the molded parts are of the type which need to be kept clean, inclusion of even one that is soiled may lead to an accident or failure during assembly.

Even if the number of molded articles accommodated in the container is counted by a counter, a tendency for some to scatter around the container makes a precise count impossible, and may lead to a shortage of parts during assembly.

Accordingly attempts have been made to provide a barrier around the exterior of the mold of the injection molding machine so as to prevent the released, molded articles from scattering and being soiled.

Such a scattering prevention screen has been proposed in the specifications of, for example, Japanese Utility Model Laid-Open No. 159225/1981 (which corresponds to Japanese Utility Model Application No. 58996/1980 entitled Movable Curtain for Plastic Molding Machine) and Japanese Utility Model Laid-Open No. 194011/1983 (which corresponds to Japanese Utility Model Application No. 92043/1982 entitled Guide Skirt for Plastic Molding Machine). In both cases, the screening device is fixed by inserting bolts or vices into threaded holes in the molds or die plates. However, drilling of the threaded holes in the molds or die plates is a time-consuming task and requires skill. When position of the screening device is shifted, more threaded holes must be drilled at new positions, making the mounting of the screening device even more troublesome. Further, the molds have to be inspected or maintained frequently, and the stationary screening device must therefore be removed and mounted each time such inspection or maintenance takes place. This is time-consuming and may cause problems in terms of production efficiency and safety.

SUMMARY OF THE INVENTION

In view of the above-described problems of the prior art, a primary object of the present invention is to provide a device for preventing the scattering of ejected, molded articles for use in a resin molding machine, which comprises synthetic resin film screens for covering the sides of a mold so as to prevent the scattering of the molded articles released from the mold after being molded by the injection molding machine, and magnetic assemblies for mounting the screens on the mold or die plates by utilizing the attractive force thereof.

A second object of the present invention is to provide a device for preventing the scattering of ejected, molded articles for use in a resin molding machine, which includes synthetic resin film screens for covering the opposite sides of a mold, each of the screens being biased in such a manner that it forms a roll, and each of the screens being rolled out from the roll and extended as it follows the movement of the mold whereas being rolled up into a roll by the bias when the mold is clamped.

A third object of the present invention is to provide a device for preventing the scattering of ejected, molded articles for use in a resin molding machine, which includes synthetic resin film screens for covering the opposite sides of a mold, the screens having accordion pleats which are extended and contracted as they follow the movement of the mold.

To achieve the above-described objects, the present invention provides, in one of its aspects, a device for preventing the scattering of ejected, molded articles for use in a resin molding machine including tie bars, a fixed mold, and a movable mold movable along the tie bars, which comprises screens made of a synthetic resin film and disposed at the opposite sides of the molds between a fixed die plate and a movable die plate and inside a space defined by the tie bars, and magnetic assemblies connected to the two lateral ends of each of the screens for fixing the screen to the opposing portions of the molds or the die plates and therebymounting the screen on the molds or the die plates, wherein the screens are extended when the molds are opened while being contracted and folded when the molds are clamped.

In a specific form of the invention, the synthetic resin film screens of the device for preventing the scattering of ejected, molded articles are each biased in such manner that they form rolls.

In another form of the invention, the synthetic resin film screens of the device for preventing the scattering of ejected, molded articles are accordion-pleated.

BRIEF DESCRIPTION OF THE DRAWINGS

In the following drawings which illustrate a device for preventing the scattering of molded articles ejected from a resin molding machine comprising an injection molding machine;

FIG. 4 is a fragmentary plan view of the modification of the scattering preventing device of FIG. 1;

FIG. 5 is a front view of FIG. 4;

FIG. 6 is a front view of a second embodiment in which the synthetic resin film screen have accordion pleats, showing a state wherein the mold is opened;

FIG. 7 is a plan view of FIG. 6;

FIG. 10 is a perspective view of main screens and auxiliary screens, in a state wherein they are coupled to each other;

FIG. 11 is a plan view of FIG. 10;

DETAILED DESCRIPTION OF THE PREFERRED EMBODIMENTS

Embodiments of the present invention will be described below in detail with reference to the accompanying drawings.

A first embodiment of the present invention will be described now.

Figure 14:
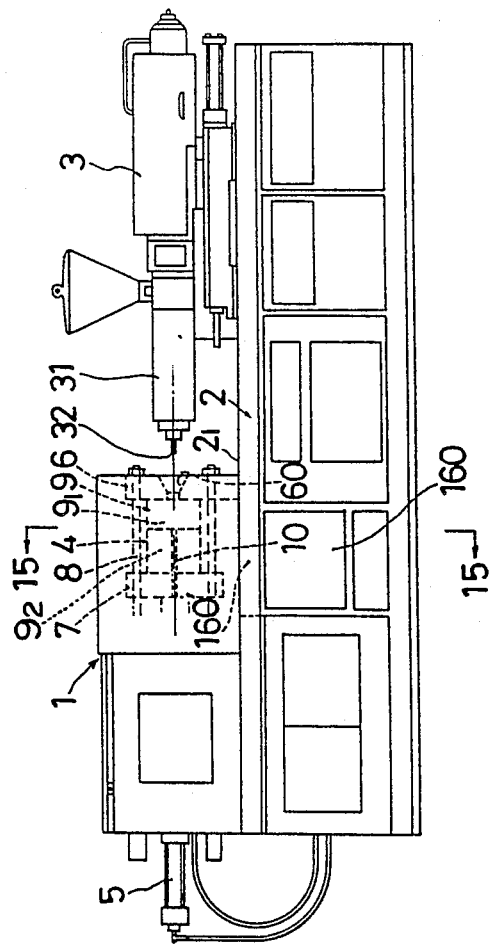
FIG. 14 is a front view of a known injection molding machine.
Figure 15:
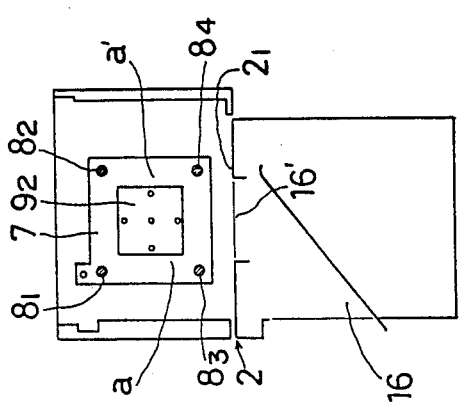
FIG. 15 is a section taken along the line 15—15 of FIG. 14.

The first embodiment includes examples shown in FIGS. 1 to 3 and FIGS. 4 and 5. In the example shown in FIGS. 1 to 3, screens 11 made of a synthetic resin film are disposed at the opposite sides of the fixed mold $9_1$ and movable mold $9_2$ between the fixed die plate 6 and the movable die plate 7 of the known injection molding machine 1 shown in FIGS. 14 and 15. They are also disposed inside a space defined by the tie bar 8 ($8_1$ to $8_4$). Each of the screens 11 includes two films $f_1$ and $f_2$ which are biased in such a manner that they form rolls P and are rolled out i two opposite directions. Elongated engaging members 14 and $14_1$ made of a resin are fitted to each of the free ends of the two films which are rolled out in the opposite directions, and are fixed thereto by rivet-shaped fasteners 16 inserted into a plurality of small holes 15 formed in the screen in the longitudinal direction.

Coupling members 23 are coupled to the engaging members 14 and $14_1$ in such a manner as to be slidable along the engaging members in the vertical direction. The coupling members are coupled at the other end to magnetic assemblies 12 so as to adhere the screen to the molds $9_1$ and $9_2$ or the die plates.

Figure 1:
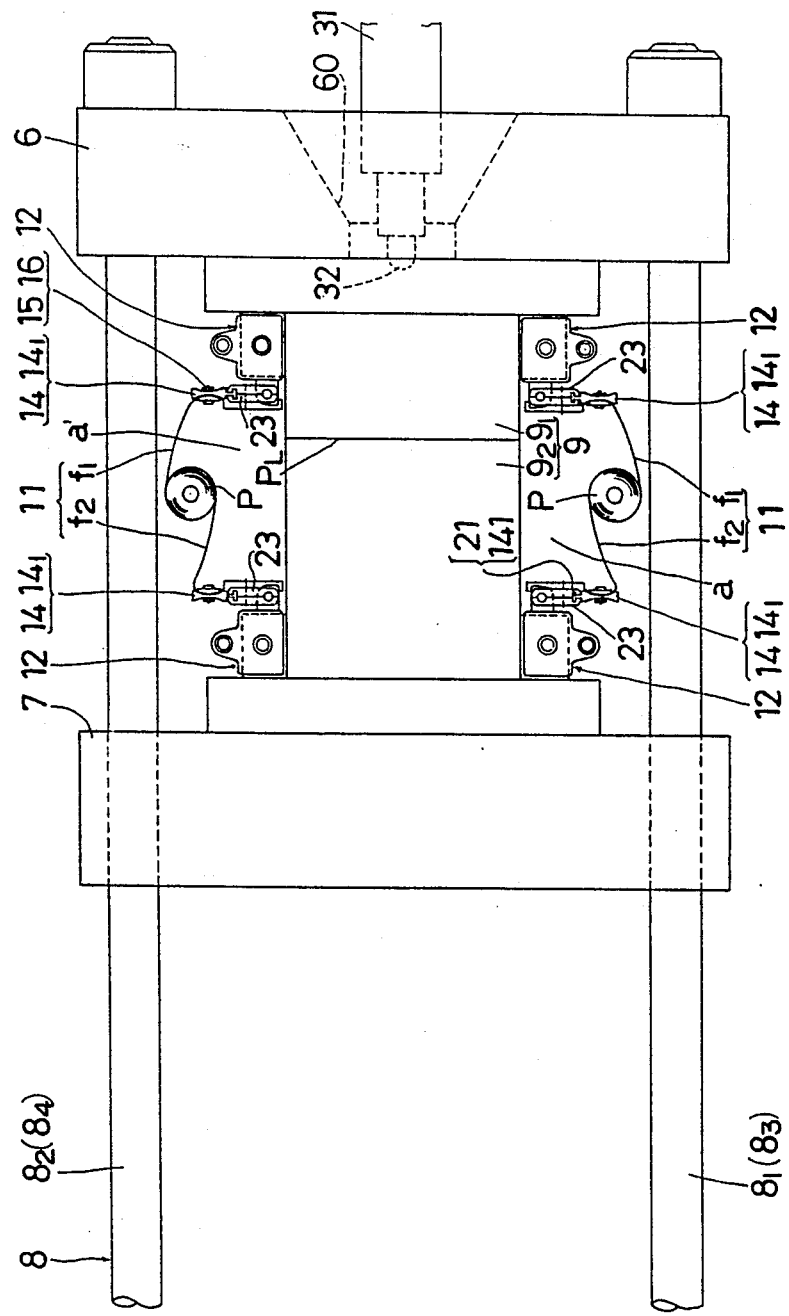
FIG. 1 is a plan view of a first embodiment of the present invention in which screens of synthetic resin film are rolled and magnetic assemblies connected to two ends of each of the screens are adhered to a mold, showing a state wherein the mold of the injection molding machine is being clamped.
Figure 2:
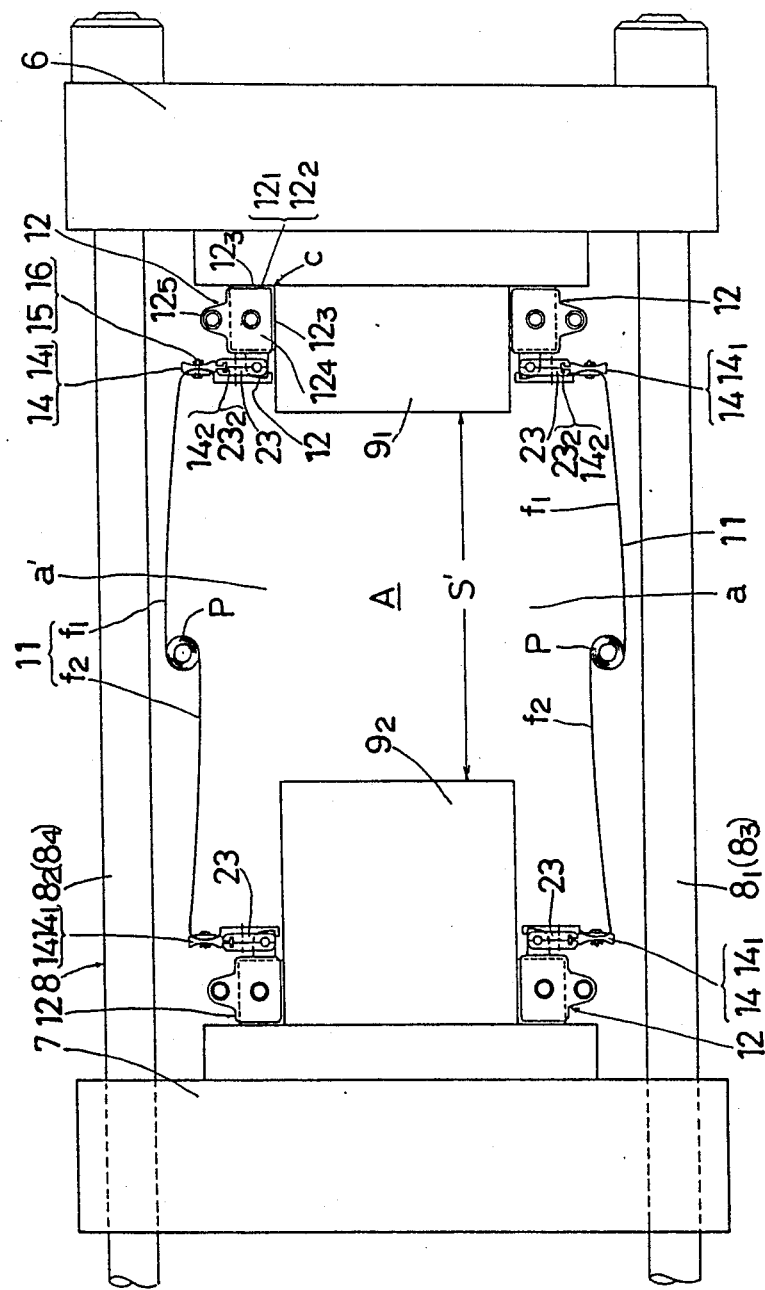
FIG. 2 is a plan view of the scattering preventing device of FIG. 1, in the state wherein the mold is open.
Figure 3:
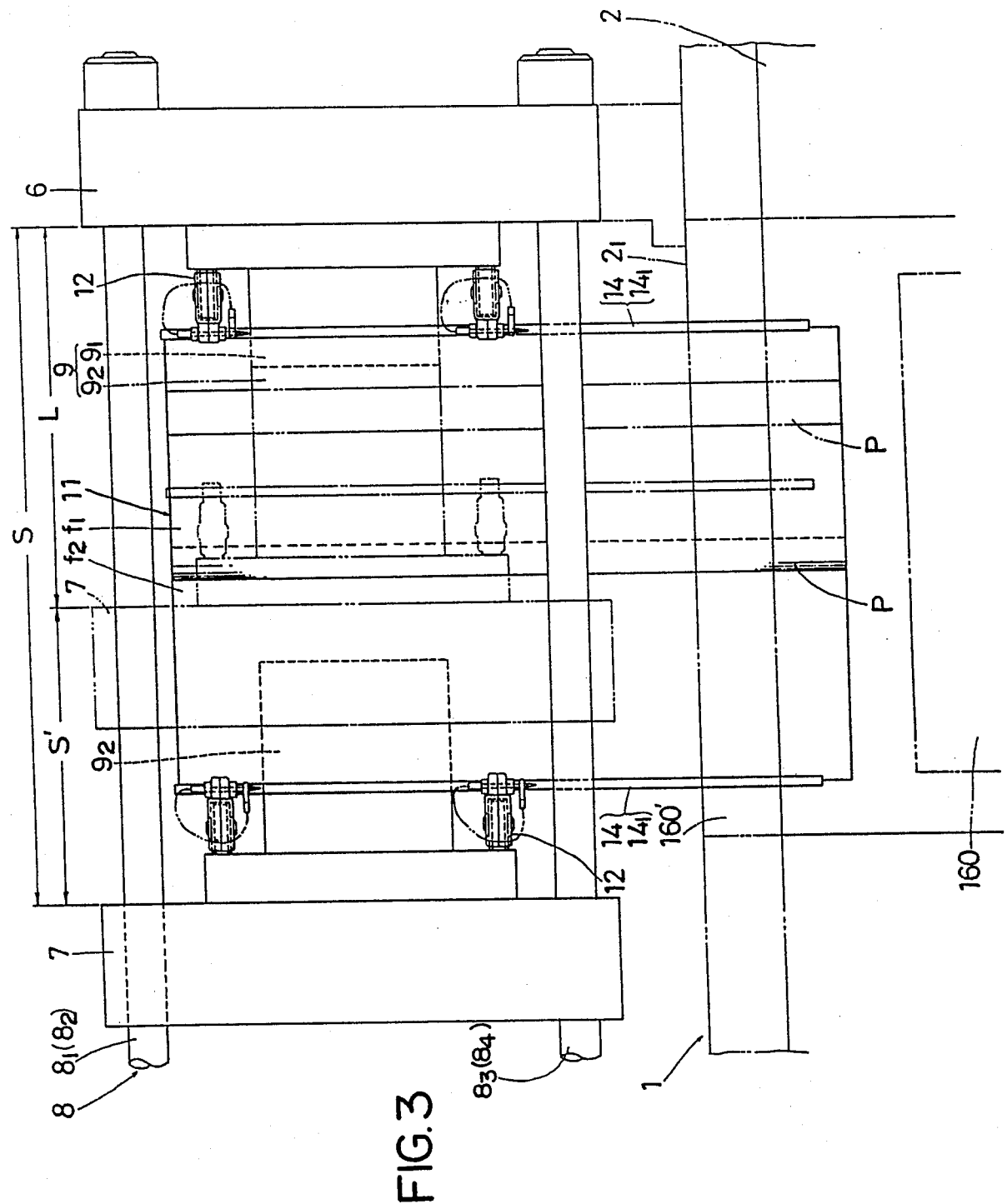
FIG. 3 is a front view of FIG. 2.
Figure 8:
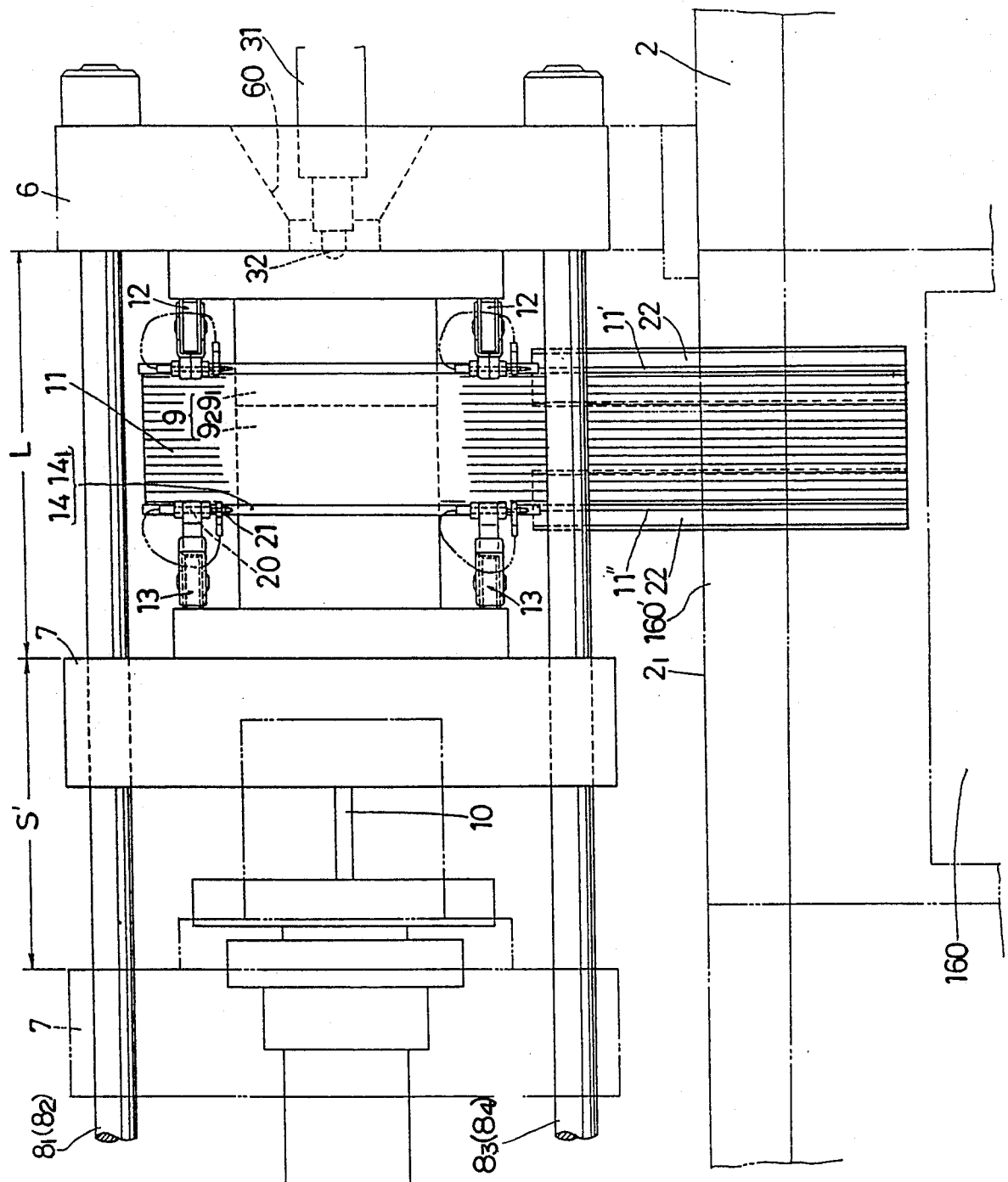
FIG. 8 is a front view of FIG. 7, showing a state wherein the mold is clamped.
Figure 9:
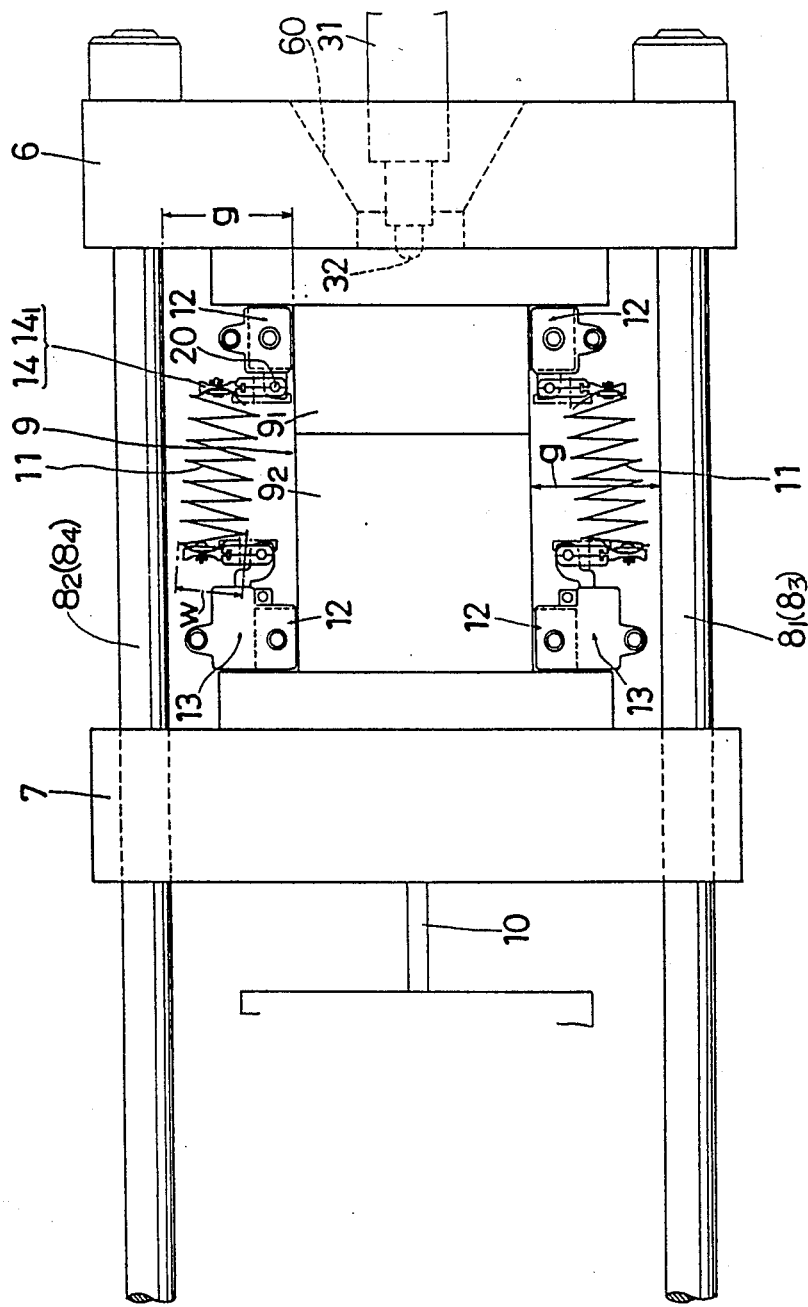
FIG. 9 is a plan view of FIG. 8.

FIGS. 4 and 5 show the modification of the example shown in FIGS. 1 to 3. In this example, the proximal end of a film f which constitutes the synthetic resin film screen 11 is mounted on a shaft 19 of a bearing member 18 in such a manner that the screen 11 is rolled up into a roll P by the bias when the mold is clamped. The distal end $11_1$ of the screen 11 and the bearing member are coupled to the elongated engaging members 14 and $14_1$, which are further coupled to the coupling members 23 and the magnetic assemblies 12 so as to mount the screen on the molds $9_1$ and $9_2$ or the die plates. In order to mount the synthetic resin film screen on the molds or the die plates more efficiently, magnetic assemblies 12' are used together with the magnetic assemblies 12, the magnetic assemblies 12' and 12 being coupled to each other by connector 122.

Either of the synthetic resin film screens shown in FIGS. 1 to 5 is assembled in the manner described below: each of the lateral ends of the screen 11 is gripped by the elongated supporting body 14 and the pressing member $14_1$, and the screen, the elongated supporting body 14 and the pressing member $14_1$ are fixed to each other by the fasteners 16, such as rivets, inserted through the holes 15. Each of the elongated supporting member is provided with a head portion $14_2$ having a T-shaped cross-section, and a groove $23_2$ of the coupling member 23 is engaged with the head portion $14_2$ in such a manner that the coupling member can slide with friction along the head portion. The coupling member 23 is coupled by a shaft to the engaging portion provided at one end of each of the magnetic assemblies shown in FIGS. 1 to 3.

A second embodiment will be described now with reference to FIGS. 6 to 11.

The main screens 11 made of a synthetic resin film are disposed at the opposing sides of the fixed mold $9_1$ and the movable mold $9_2$ between the fixed die plate 6 and the movable die plate 7 and inside a space defined by the tie bars 8 ($8_1$ to $8_4$). The engaging members 14 and $14_1$ are fitted to each of the lateral ends 11' and 11" of each of the screens 11, and the engaging members 14 and $14_1$ and the screen are fixed to each other by the fasteners 16 inserted through the holes 15 formed in the screen.

Each of the main screens 11 is accordion-pleated, and the width w of its pleats is made smaller than a distance g between the sides of the molds $9_1$ and $9_2$ and the inner side of the tie bar 8 ($8_1$ to $8_4$).

Auxiliary screens 22 are provided below the fixed mold $9_1$ and the movable mold $9_2$, respectively, in such a manner that they face each dother. The two sides 22' and 22" of the auxiliary screens 22 are coupled to the two ends 11' and 11" of the main screens 11 hanging below the lower tie bars $8_3$ and $8_4$ so as to form an enclosure.

The main screens 11 and the auxiliary screens 22 are made of a soft, strong and transparent nylon resin film having a thickness of about 0.2 mm, such as nylon 66. They may also be made of polyethylene terephthalate resin film. Each of the main and auxiliary screens has a height which enables its lower end to hang below the inlet $16_0'$ of the discharge section of the injection molding machine.

Each of the auxiliary screens 22 is also accordion-pleated, like the main screen 11, so as to enable the lateral dimension thereof to be adjusted in accordance with the size of the mold.

Figure 12:
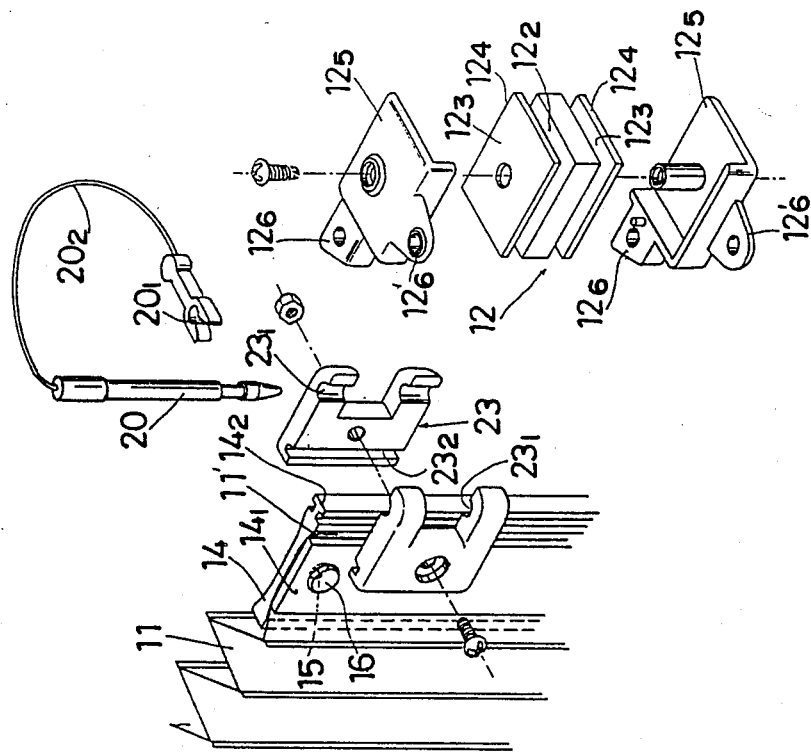
FIG. 12 is an exploded perspective view of a magnetic assembly and a coupling member.

FIG. 12 shows an example of the mounting portion of the magnetic assembly 12 and the screen 11. The magnetic assembly 12 comprises a magnet piece $12_2$, a pair of yokes $12_3$ placed on and at the bottom of the magnet piece $12_2$, and non-magnetic holders $12_1$ for accommodating the yokes and magnet piece. The two sides of the magnetic assembly 12 which join at the corner indicated by c form attracting portions $12_4$. The sides of the non-magnetic holders $12_5$ which oppose the attracting portions are provided with engaging portions $12_6$.

Figure 13:
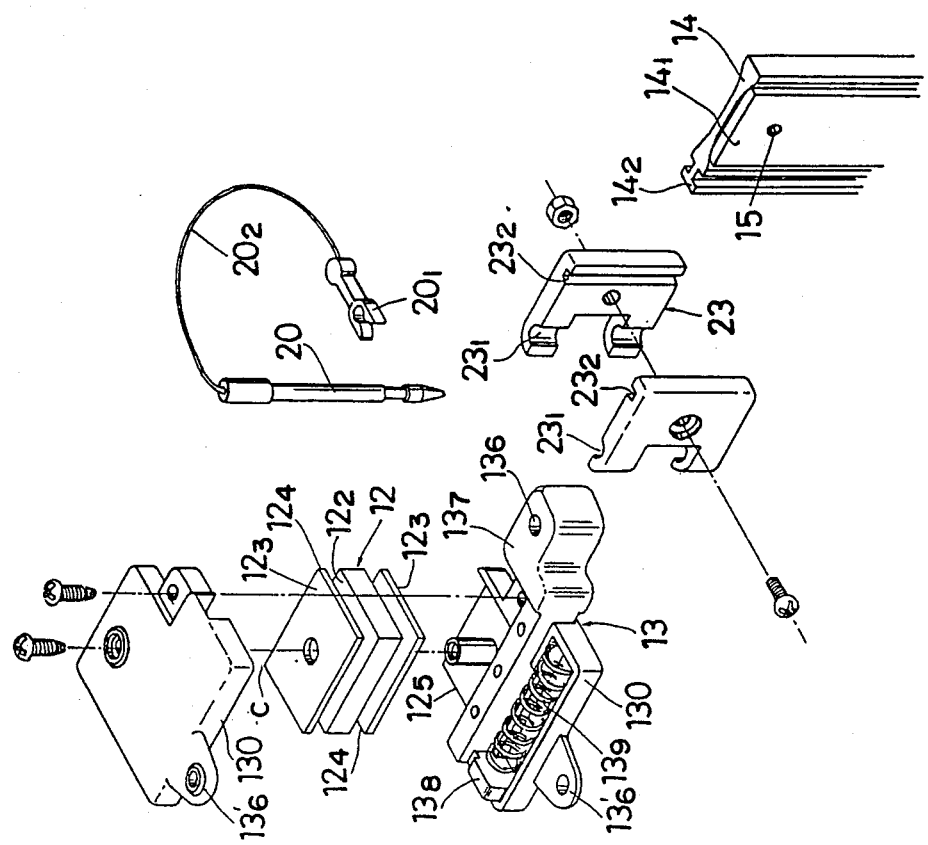
FIG. 13 is an exploded perspective view of a coupling member and a magnetic assembly provided with a shock absorbing mechanism.

FIG. 13 shows an example of a magnetic assembly 12 provided with a shock absorbing mechanism 13. The magnetic assembly 12 of this type includes, in addition to the components shown in FIG. 16, a connecting body $13_7$ having an engaging portion $13_6$, a casing 130 formed integrally with the connecting body, a projection $13_8$ accommodated in the casing 130, and a coil spring $13_9$ accommodated in the casing. The coil spring $13_9$ of the shock absorbing mechanism 13 absorbs any tensile impact imparted to the magnetic assembly 12 by the extended synthetic resin film screen 11 which follows the movement of the mold.

The function as well as the operation of the first and second embodiments will be described below in detail in that order.

In the first embodiment shown in FIGS. 1 to 3, the films $f_1$ and $f_2$ of each of the synthetic resin film screens 11 are biased in such a manner that they form rolls in the vicinity of a parting line $P_L$ of the fixed mold $9_1$ and the movable mold $9_2$. The free ends of each of the synthetic resin film screens 11 are rolled out in two opposite directions, and are fixed to the molds $9_1$ and $9_2$ or the die plates 6 and 7 by the magnetic assemblies 12. When the mold is clamped, as shown in FIG. 1, the synthetic resin film screens 11 are each rolled up into rolls by the bias at the substantially central position between the molds $9_1$ and $9_2$.

In the modification of the first embodiment shown in FIGS. 4 and 5, the proximal end of the film f of each of the synthetic resin film screens is fixed to the shaft 19 of the bearing member 18, and the screen is rolled up into a roll P by the bias at a position closer to the movable mold $9_2$ when the mold is clamped.

In the second embodiment shown in FIGS. 6 to 11, the accordion-pleated synthetic resin film screens 11 are contracted in such a manner that their pleats are positioned within the gap g formed by the tie bars 8 ($8_1$, $8_3$ and $8_2$, $8_4$) and the mold 9 ($9_1$ and $9_2$) when the molds $9_1$ and $9_2$ are clamped.

In a subsequent process of the molding, the heating cylinder 31 of the injection mechanism section is advanced, by reason of which the nozzle 32 of the heating cylinder is brought into contact with the sprue of the mold $9_1$ through a hole 60 of the fixed die plate 6, and injection is then conducted in accordance with the known molding process of the injection molding machine. After the molding is completed, the movable die plate 7 is moved away from the fixed die plate 6 through a set stroke S'. Following this movement of the movable die plate 7 and the movable mold $9_2$, the screens 11 are extended in such a manner that they curtain open spaces a and a'. In consequence, the molded articles which are released from the movable mold $9_2$ by being ejected by the ejector 10 are led to the discharge port $16_0$ then into a certain container by the synthetic resin film screens 11, without contacting the tie bar 8 ($8_1$ to $8_4$) or scattering outside the container.

When the movable mold $9_2$ is advanced toward the fixed mold $9_1$ for reclamping, the synthetic resin film screens 11 of the first embodiment follow the movement of the movable mold $9_2$, and are rolled up into rolls P.

The synthetic resin film screens 11 of the second embodiment that follow the movement of the movable mold $9_2$ are contracted in such a manner that they form accordion pleats, thereby returning to their original positions and thus completing one cycle of the operation.

The shock imparted to each of the extended screens 11 is absorbed by the connecting body $13_7$ as well as the protrusion $13_8$ and the coil spring $13_9$ constituting the shock absorbing mechanism, the protrusion and the coil spring being accommodated in the casing 130. An example of a magnetic assembly provided with the connecting body and the casing is shown in FIGS. 6 to 9 and 13.

Since the screens of the scattering preventing device according to the present invention cover the opposite sides of the fixed and movable molds of the injection molding machine which produces small and precision molded articles, the sides of a gap formed when the molds are parted are curtained. In consequence, even if the molded articles are hurled out of the mold by the pressure generated by the ejector, they bounce against the screens mounted only by the use of magnetic assemblies and fall inwardly through the discharge port into the container provided without being scattered on the floor around the injection molding machine. It is therefore possible to increase the production yield and the production efficiency.

If the length of each of the screens is set such that the lower end of the screen hangs below the discharge port, prevention of scattering of the molded articles can be carried out even more efficiently.

The auxiliary screens mounted on the lower ends of the opposed molds are capable of curtaining the other two sides of the space between the molds which cannot be curtained by the main screens, thereby making the curtaining of the four sides of the space formed by the opposed molds possible and further increasing the efficiency of scattering prevention. The screens which curtain the first two sides of the space formed by the open molds are disposed inside the space defined by the tie bars. Therefore, when molded articles are ejected by the ejector, they do not make contact with the lower tie bars, eliminating the possibility of molded articles becoming soiled by the oil on the tie bars.

Any synthetic resin can be used to form the screens so long as it is flexible, heat-resistant, and oil-resistant. However if a transparent film resin is employed, the molds can be seen through the screens even when the entire exterior thereof is covered. This makes the inspection easier and ensures the safety. The flexibility of the thin screens enables them to be rolled up or rolled out, or extended and contracted to form accordion pleats as they follow the movement of the movable die plate. This means that the screens do not occupy a large space when folded. Since the screens are heat-resistant, they will not become melted or deformed even when disposed in the vicinity of the molds, whose temperature is raised very high.

The screens are removably fixed to the molds or die plates by using the magnetic assemblies. They can therefore be mounted or removed very easily at the time of maintainance or inspection, as compared with the fixed type screens of the prior art. The width of the screens can be adjusted, and the position at which the screens are fixed can also be varied in the longitudinal direction. These factors enable the screens to be employed with molds which are different in size or in shape, or in a resin molding machine of a different type. The screens can be assembled very easily, which ensures improved manageability.

No bending lines are provided on the synthetic resin film screens of the type which are rolled up into and rolled out from a roll. The screens of this type are not deformed outside the tie bar. Since the length of the screens is set such that they hang below the discharge port, scattering of the molded articles can be prevented more efficiently.

In the synthetic resin film screens of the type which is folded into accordion pleats, since the length thereof is set such that they hang below the discharge port, scattering of the molded articles can be prevented more efficiently.

When the molds are open, unnecessary contact between the released molded articles and sections of the molding machine can be avoided, thereby eliminating the risk of damage or soiling of the molded articles.

What is claimed is:

1. A device for preventing scattering of ejected, molding articles from a resin molding machine, said machine including two pairs of upper and lower tie bars, a stationary mold, and a movable mold, said movable mold being movable along said tie bars, wherein said movable mold is capable of moving between a first position in which said movable mold is closely adjacent to said stationary mold and a second position in which said movable mold is spaced from said stationary mold, wherein when said molds are in said second position, a substantially parallelepipedic space is formed between said molds and said tie bars, said tie bars defining opposite sides of said space, said device comprising:
   (a) synthetic resin film screens which are substantially disposed within said space, said screens being positioned along the opposite sides of said space which is formed when said fixed mold and said movable mold are in said second position, each screen having two ends; and
   (b) magnetic assemblies connected to the ends of each of said synthetic resin film screens, said magnetic assemblies comprising means for attaching said screens to either said molds or to die plates via the attractive force of said magnetic assemblies, wherein said synthetic resin film screens are mounted on said molds or die plates via the use of only said magnetic assemblies, said screens thereby being expanded and contracted in response to movement of said movable mold.

2. A device in accordance with claim 1, wherein said synthetic film screens are extended when said movable mold moves away from said stationary mold and are contracted when said movable mold moves toward said stationary mold.

3. A device in accordance with claim 1, wherein said screens are adapted to be folded when said molds are in said first position and are adapted to be extended from said folded position when said molds are in said second position.

4. A device in accordance with claim 3, wherein said folded screen includes a plurality of accordion pleats when said screens are folded.

5. A device in accordance with claim 1, wherein each of said screens is foldable into an accordion type pleated configuration.

6. A device in accordance with claim 5, wherein each of said accordion type screens has a plurality of pleats, each of said pleats having a width which is smaller than the distance between an exterior side surface of each of the molds and an inner surface of a tie bar immediately adjacent to said mold.

7. A device in accordance with claim 1, further comprising a plurality of auxiliary screens which are opposed to each other, each of said auxiliary screens being attached to a lower end of one of said first and second screens and being located beneath a lowermost one of said tie bars.

8. A device in accordance with claim 7, wherein said molding machine includes a discharge section, and wherein each of said auxiliary screens has a lower end which extends below an inlet of said discharge section.

9. A device in accordance with claim 7, wherein each of said auxiliary screens is accordion pleated.

10. A device in accordance with claim 7, further comprising third and fourth auxiliary screens, all of said auxiliary screens together defining a substantially tubular configuration.

11. A device in accordance with claim 1, wherein each magnetic assembly comprises a first magnetic piece, a pair of yokes attached to a bottom surface of said magnetic piece, and a plurality of nonmagnetic holders for receiving said yokes and said magnetic piece.

12. A device in accordance with claim 1, wherein each of said magnetic assemblies includes a shock absorbing mechanism having a connecting body, an engaging portion, a casing formed integrally with said connecting body, a projection positioned within said casing, and a coiled spring positioned within said casing, said coiled spring comprising means for absorbing tensile impacts imparted to said magnetic assembly by extension of said first and second screens.

13. A device for preventing scattering of ejected, molding articles from a resin molding machine, said machine including two pairs of upper and lower tie bars, a stationary mold, and a movable mold, said movable mold being movable along said tie bars, wherein said movable mold is capable of moving between a first position in which said movable mold is closely adjacent to said stationary mold and a second position in which said movable mold is spaced from said stationary mold, wherein when said molds are in said second position, a substantially parallelepipedic space is formed between said molds and said tie bars, said tie bars defining opposite sides of said space, said device comprising:
   (a) synthetic resin film screens which are substantially disposed within said space, said screens being positioned along the opposite sides of said space which is formed when said fixed mold and said movable mold are in said second position, each screen having two ends; and
   (b) magnetic assemblies connected to the ends of each of said synthetic resin film screens, said magnetic assemblies comprising means for attaching said screens to either said molds or to die plates via the attractive force of said magnetic assemblies, wherein said synthetic resin film screens are mounted on said molds or die plates via the use of only said magnetic assemblies, said screens thereby being expanded and contracted in response to movement of said movable mold, each of said screens being wound into a roll when contracted and being unwound from said roll when expanded.

14. A device in accordance with claim 13, wherein said roll is positioned between said stationary mold and said movable mold.

15. A device in accordance with claim 13, wherein each of said synthetic film screens is adapted to be unwound from a roll in opposite directions.

16. A device in accordance with claim 13, wherein each said screen is rolled about a shaft of a bearing member, each said bearing member being attached to a magnetic assembly via a coupling member.

17. A device in accordance with claim 13, wherein at least one of said magnetic assemblies is attached to an additional magnetic assembly which is mounted on one of said molds.

18. A device in accordance with claim 13, wherein each of said screen is gripped by a elongated supporting member, said elongated supporting member having a generally T-shaped head portion, said device further comprising a coupling member adapted to couple each said screen to one of said magnetic assemblies, said coupling member having a groove which is adapted to be attached to said head portion.

19. A device in accordance with claim 18, wherein said coupling member is slidable along said groove, said coupling member being attached to a shaft at one end of a magnetic assembly.

20. A device for preventing scattering of ejected, molding articles from a resin molding machine, said machine including two pairs of upper and lower tie bars, a stationary mold, and a movable mold, said movable mold being movable along said tie bars, wherein said movable mold is capable of moving between a first position in which said movable mold is closely adjacent to said stationary mold and a second position in which said movable mold is spaced from said stationary mold, wherein when said molds are in said second position a substantially parallelepipedic space is formed between said molds and said tie bards, said tie bars defining opposite sides of said space, said device comprising:

(a) synthetic resin film screens which are substantially disposed within said space, said screens being positioned along the opposite sides of said space which is formed when said fixed mold and said movable mold are in said second position, each screen having two ends; and (b) magnetic assemblies connected to the ends of each of said synthetic resin film screens, said magnetic assemblies comprising means for attaching said screens to either said molds or to die plates via the attractive force of said magnetic assemblies, wherein said synthetic resin film screens are mounted on said molds or die plates via the use of only said magnetic assemblies, said screens thereby being expanded and contracted in response to movement of said movable mold, each of said screens being wound into a roll when contracted and being unwound from said roll when expanded, wherein said wound screens are positioned between the opposite sides defined by said tie bars, said screens being adapted to be unwound from said roll in opposite directions and extended when said mold sections are in said second position.

21. A device in accordance with claim 20, wherein each of said screens include two films which are adapted to be wound and unwound from said roll.

22. A device in accordance with claim 20, wherein each of said films has a free end to which an elongated engaging member is attached, each elongated engaging member also being attached to a respective magnetic assembly via a coupling member.

* * * * *

UNITED STATES PATENT AND TRADEMARK OFFICE
CERTIFICATE OF CORRECTION

PATENT NO. : 4,911,630

DATED : MARCH 27, 1990

INVENTOR(S) : A. UEHARA

It is certified that error appears in the above-identified patent and that said Letters Patent is hereby corrected as shown below:

In the Abstract, line 12, change "screen" to ---screens---.
Column 1, line 17, change "being" to ---are---.
Column 1, line 35, change "66" to ---6---.
Column 1, line 38, change "counted" to ---mounted---.
Column 2, line 67, change "therebymounting" to ---thereby mounting---.
Column 3, line 29, change "screen" to ---screens---.
Column 3, line 66, change "i" to ---in---.
Column 3, line 68, change "arerolled" to ---are rolled---.
Column 4, line 60, change "dother" to ---other---.
Column 5, line 22, change "16" to ---13---.
Column 9, line 24, (claim 18, line 2), change "screen" to ---screens--- after "said," and change "a" to ---an--- after "by".
Column 10, line 6, (claim 20, line 12), change "bards" to ---bars---.

Signed and Sealed this

Second Day of June, 1992

*Attest:*

DOUGLAS B. COMER

*Attesting Officer*     *Acting Commissioner of Patents and Trademarks*